(12) United States Patent
Faris

(10) Patent No.: US 7,377,948 B2
(45) Date of Patent: May 27, 2008

(54) LAYERED ELECTROCHEMICAL CELL AND MANUFACTURING METHOD THEREFOR

(75) Inventor: Sadeg M. Faris, Pleasantville, NY (US)

(73) Assignee: Reveo, Inc., Hawthorne, NY (US)

( * ) Notice: Subject to any disclaimer, the term of this patent is extended or adjusted under 35 U.S.C. 154(b) by 228 days.

(21) Appl. No.: 10/455,228

(22) Filed: Jun. 5, 2003

(65) Prior Publication Data

US 2004/0038090 A1    Feb. 26, 2004

Related U.S. Application Data

(60) Provisional application No. 60/386,121, filed on Jun. 5, 2002.

(51) Int. Cl.
*H01M 2/00* (2006.01)
*H01M 2/14* (2006.01)

(52) U.S. Cl. ............ 29/623.1; 29/623.3; 429/246; 429/247; 429/94; 429/162; 429/41; 429/42; 429/304; 429/305; 429/306; 429/307

(58) Field of Classification Search .................. None
See application file for complete search history.

(56) References Cited

U.S. PATENT DOCUMENTS

| | | | | |
|---|---|---|---|---|
| 3,708,349 A | * | 1/1973 | Macaulay et al. | 29/623.3 |
| 4,051,304 A | | 9/1977 | Snook | 429/94 |
| 4,124,742 A | | 11/1978 | Land et al. | 429/122 |
| 4,125,685 A | | 11/1978 | Bloom et al. | 429/122 |
| 4,761,352 A | | 8/1988 | Bakos et al. | 429/94 |
| 5,605,550 A | * | 2/1997 | Jensen et al. | 29/623.3 |
| 6,416,559 B1 | * | 7/2002 | Matsumura et al. | 29/623.1 |
| 2004/0048151 A1 | * | 3/2004 | Hayashi et al. | 429/162 |

FOREIGN PATENT DOCUMENTS

| | | | |
|---|---|---|---|
| EP | 0357399 | | 3/1990 |
| EP | 0390557 | | 10/1990 |
| EP | 0 614 237 A1 | * | 1/1994 |
| EP | 0614237 | * | 1/1994 |
| EP | 0614237 | | 9/1994 |
| WO | WO0072394 | | 11/2000 |
| WO | WO02/29913 | * | 4/2002 |

OTHER PUBLICATIONS

International Search Report, PCT/US03/17587, dated Feb. 5, 2004.

* cited by examiner

*Primary Examiner*—Raymond Alejandro
*Assistant Examiner*—Cynthia Lee
(74) *Attorney, Agent, or Firm*—Ralph J. Crispino

(57) ABSTRACT

Methods of the present invention are provided for forming a plurality of electrochemical cell layers, each cell layer generally including a pair of electrodes and a separator electrically insulating the pair of electrodes. Cells of a desired size are formed by slicing the laminar sheet through both opposing major surfaces. In certain embodiments, individual cells are defined by fill regions, filled with removable substances. Thus, when the cells are sliced, individual cells and in certain embodiments current collectors or conductors are exposed with minimal or no further processing. In other embodiments, fluid access channels or porous layers are filled with removable substances. Thus, when the cells are sliced, structural support is provided for the intended void regions.

36 Claims, 7 Drawing Sheets

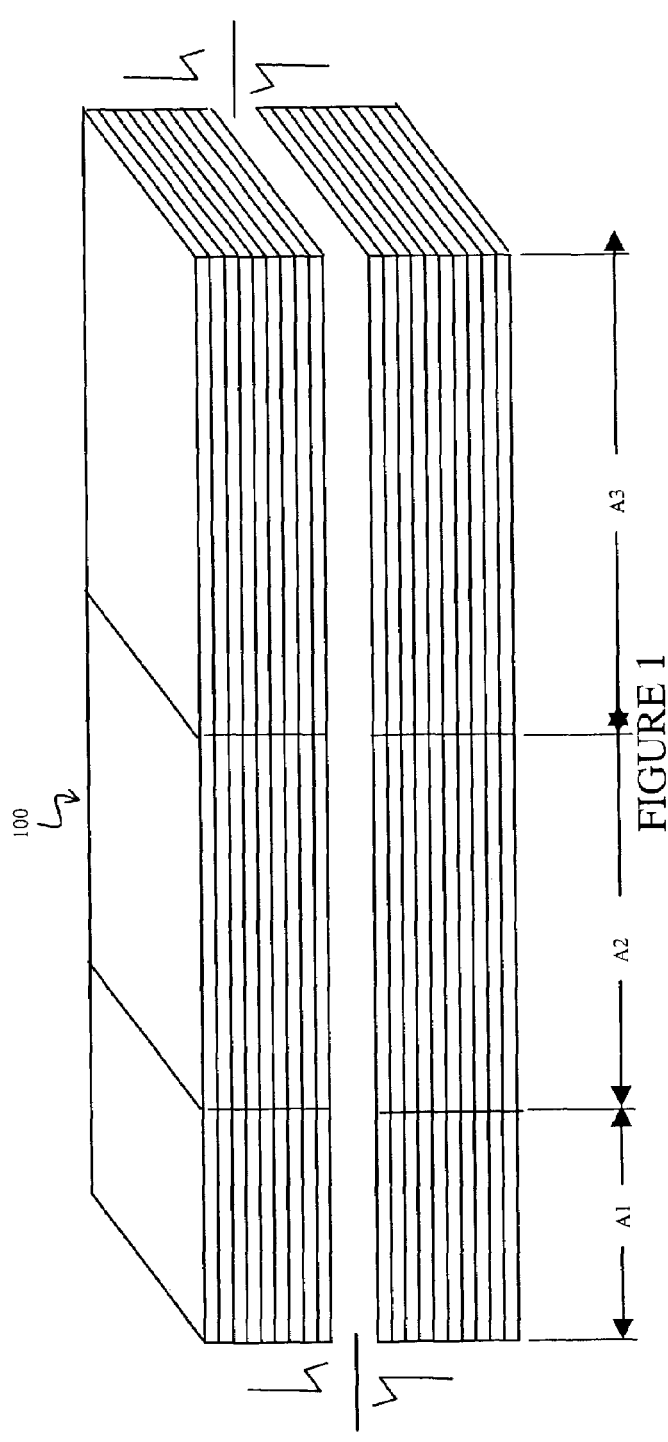
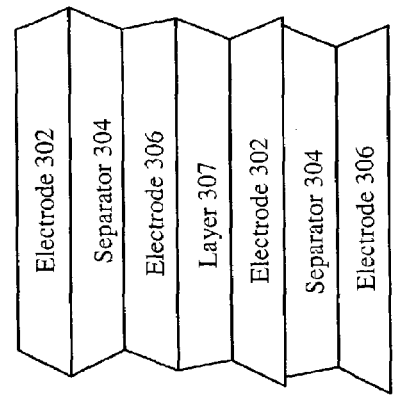
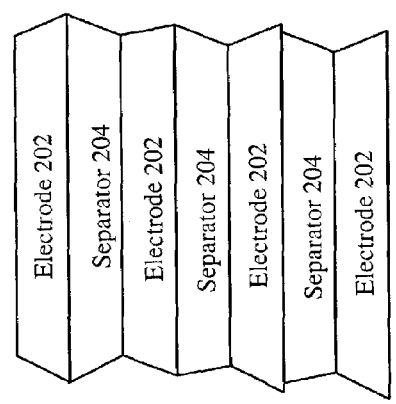
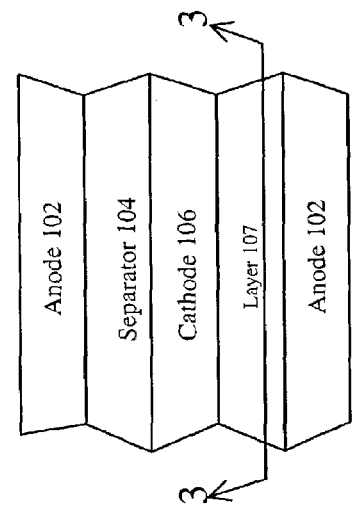
FIGURE 1
FIGURE 2A
FIGURE 2B
FIGURE 2C

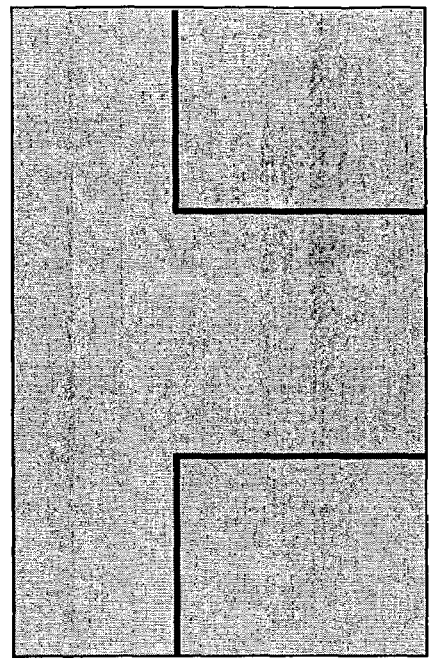
FIGURE 4D4
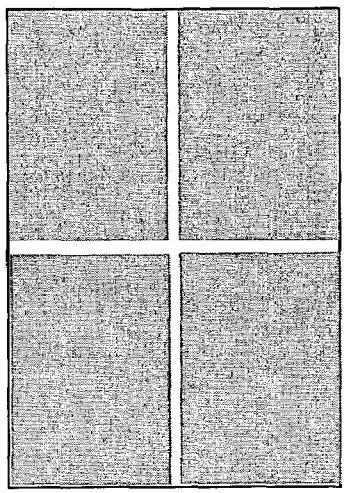
FIGURE 4D3
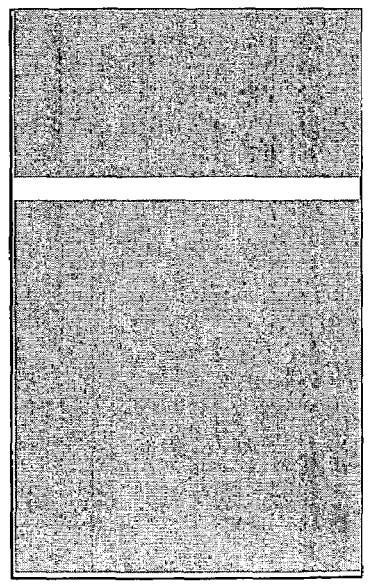
FIGURE 4D2
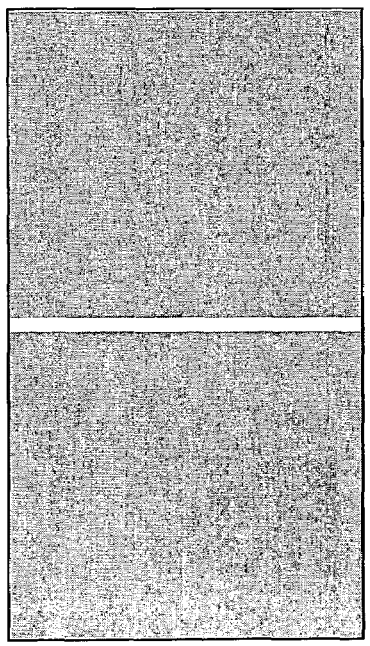
FIGURE 4D1

LAYERED ELECTROCHEMICAL CELL AND MANUFACTURING METHOD THEREFOR

RELATED APPLICATIONS

The present application claims priority to U.S. Provisional Patent Application Ser. No. 60/386,121 filed on Jun. 5, 2002, which is incorporated by reference herein.

BACKGROUND

Electrochemical cells are ubiquitous in apparatus used by humans universally. These include electrical power sources such as batteries, fuel cells, and capacitors, as well as electrically induced chemical processes, such as deionization and fluid separation.

One example of an attempt to efficiently manufacture electrochemical cells is disclosed in EP 0 357 399 B1, wherein methods are provided for forming "jelly roll" or cube-shaped electrochemical cells. Also, EP 0 202 857 B1 discloses a method for forming an electrode assembly. Basically, a cell including a laminate of electrodes and solid electrolyte are either rolled to form a jelly roll cell, or fan folded to form a cube shaped cell. In EP 0 357 399 B1, current collector tabs are extended from the assembly for each fold layer, and subsequently electrically connected. In EP 0 202 857 B1, a single tab is formed at a distal end of the assembly for each electrode. These methods are limited in that only a single cell may be formed at a time. At best, long strips of laminate may be formed, cut, and rolled or folded. However, no method is taught to efficiently expose current collectors if the laminate is cut. It is known to grind or otherwise trim active electrolyte material to expose electrolyte, but this is time consuming and hence expensive.

Another example of an attempt to efficiently manufacture electrochemical cells is disclosed in U.S. Pat. No. 4,051304, wherein a lead acid cell is formed by using a single metal strip as the support for the active material of the positive electrode of one cell and the negative electrode of a neighboring cell. A length of such cells, naturally in a series electrical connection, are folded or wound and pressed into a cell structure, exposing a positive terminal at one end and a negative terminal at the other end. However, if a long strip is to be formed and cut to form plural cell structures, no method is taught to expose current collectors at the cut line.

Polaroid also forms a flat battery, as described, for example, in Chapter 8.37, Handbook of Batteries, $3^{rd}$ Ed. for Polaroid P-80 design having a 6 V stack of 4 cells: The system uses laminate cells each having an anode current collector, Zn on conductive vinyl, cellophane, manganese dioxide with electrolyte(Zn-chloride), and a cathode current collector. Conductors are interconnected by subsequent laminating and trimming steps.

Another disadvantage of the above mentioned conventional cells and manufacturing methods is the inability to provide fluid flow (gas or liquid) between electrodes formed by a convenient laminating method.

SUMMARY OF THE INVENTION

The above-discussed and other problems and deficiencies of the prior art are overcome or alleviated by the several methods of the present invention for forming a plurality of cell layers into a laminar sheet having two opposing major surfaces, each cell layer including a pair of electrodes and a separator electrically insulating the pair of electrodes. Cells of a desired size are formed by slicing the laminar sheet through both opposing major surfaces.

In certain embodiments, individual cells are defined by fill regions, filled with removable substances. Thus, when the cells are sliced, individual cells and in certain embodiments current collectors or conductors are exposed with minimal or no further processing.

In other embodiments, fluid access channels or porous layers are filled with removable substances. Thus, when the cells are sliced, structural support is provided for the intended void regions.

The above-discussed and other features and advantages of the present invention will be appreciated and understood by those skilled in the art from the following detailed description and drawings.

BRIEF DESCRIPTION OF THE DRAWINGS

FIG. 1 depicts an isometric view of a stack of layers;

FIG. 2A shows one embodiment of a partial side view of the stack of FIG. 1;

FIG. 2B shows another embodiment of a partial side view of stack of FIG. 1;

FIG. 2C shows a further embodiment of a partial side view of stack of FIG. 1;

FIGS. 4D1-4D4 depict various exemplary embodiments of positions and configurations of the fill regions identifying cut lines;

DETAILED DESCRIPTION

Figure 3B:
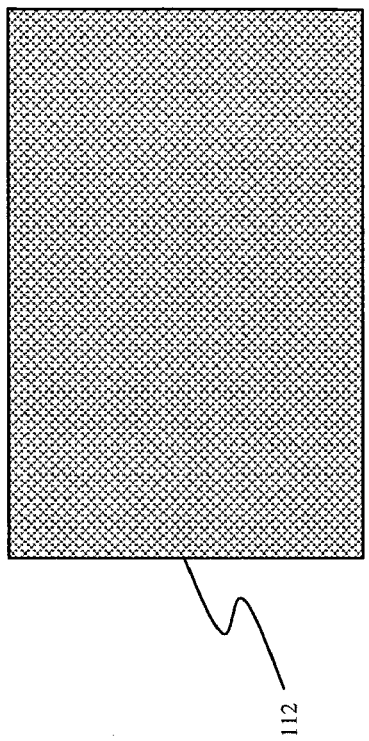
FIG. 3B shows an interconnecting layer between adjacent cells including porous conductive material.

FIG. 1 depicts an isometric view of a stack of layers 100. The stack may be of any desired number of repeating or varying electrodes or electrode assemblies. This stack may then be cut generally perpendicular to the plane of each layer, and optionally parallel to the plane of a layer, as described further herein. In one general embodiment, one or more kerf regions are provided in certain layers to facilitate cutting and electrical connection of electrode conductors (e.g., current collectors). In another general embodiment, a stack may include layers that allow fluid flow, which may be useful, for example, in metal air cells (air flow), PEM fuel cells (hydrogen flow), solid oxide fuel cells (hydrocarbon fluid), or flow through capacitors (e.g., fluid deionization).

Referring now to FIG. 2A, one embodiment of a partial side view of stack 100 is depicted. The layers form a plurality of electrochemical cells. The layers include repeating groups of layers, wherein each group generally comprises an anode layer 102, a separator layer 104, and a cathode layer 106. A layer 107 is between one electrode layer 106 of one cell and another electrode layer 102 of an adjacent cell, and embodiments of layer 107 are described further herein.

Referring now to FIG. 2B, another embodiment of a partial side view of stack 100 is depicted. The layers include repeating groups of layers, wherein each group generally comprises an electrode layer 202, a separator layer 204, and an opposing electrode layer 202. As will be discussed herein, the electrodes 202 may be the same or different, depending on the type of electrochemical cell being manufactured.

Referring now to FIG. 2C, a further embodiment of a partial side view of stack 100 is depicted. The layers include repeating groups of layers, wherein each group generally comprises a first electrode layer 302, a separator layer 304, and a second electrode layer 306. A layer 307 may be the same as layer 107, or alternatively layer 307 may be a solid insulator (e.g., for cells intended to be connected in parallel or in series via external current collector connection), or a solid conductor layer (e.g., for cells be connected in series)

It should be appreciated that the layers may vary in dimension depending on the intended use of the electrochemical cell. For example, for very high energy discharge, very thin (e.g., micron) electrode layers may be formed. Alternatively, for low rate, high capacity cells, thicker electrodes (e.g.,>1 millimeter) may be formed. Of course, for even higher capacity cells, the layers may be up to several centimeters thick.

As discussed above, many types of electrochemical cells may be manufactured starting with the stack 100. Herein described will be batteries and capacitors, although other electrochemical cells may also be formed according to the methods described herein.

The general structures, as described above, all have common characteristics including opposing electrodes and a separator for electrically isolating the opposing electrodes. In certain cells including capacitors (power providing) and batteries, an electrolyte is provided for ionic communication between the electrodes.

Hereinafter, major components of various types of electrochemical cells are described, broken down generally by major components including the separators and electrodes. Supporting structures (e.g., layer 107 described above) and electrolytes are also discussed.

Batteries
 Separator

The separator (in general for any battery) may comprise any commercial available separator as used in the battery industry. Suitable separators are provided in forms including, but not limited to, woven, non-woven, porous (such as microporous or nanoporous), cellular, polymer sheets, and the like. Further, precursor materials may be used to form the separator layer in situ.

Materials for the separator include, but are not limited to, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from du Pont), cellophane, filter paper, and combinations comprising at least one of the foregoing materials. The separator may also comprise additives and/or coatings such as acrylic compounds and the like to make them more wettable and permeable to the electrolyte.

Alternatively, the separator may also provide electrolyte to the electrochemical cell, for example in the form of a solid-state membrane. Suitable membranes are described in commonly assigned: U.S. Pat. No. 6,183,914, entitled "Polymer-based Hydroxide Conducting Membranes", to Wayne Yac, Tsepin Thai, Yuen-Ming Chang, and Mugno Chan, filed on Sep. 17,1998; U.S. Pat. No. 6,605,391 entitled "Solid Gel Membrane", by Mnguo Chat, Tsepin Thai, Wayne Yac, Ynm-Ming Chang, Lin-Feng Li, and Tom Karen, filed on Feb. 26, 1999; U.S. Pat. No. 6,358,651 entitled "Solid Gel Membrane Separator in Rechargeable Electrochemical Cells", by Mugun Chat, Tsepin Thai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001, now abandoned; and U.S. Pat. No. 6,849,702, entitled "Electrochemical Cell Incorporating Polymer Matrix Material", by Robert Callahan, Mark Stevens and Mugno Cheat, filed on Aug. 30, 2001; all of which are incorporated by reference herein in their entireties.

A separator may be laminated in the stack between electrodes as appropriate for the type of battery. Alternatively, a separator may be formed in situ on the stack, wherein separator precursor materials (e.g., any suitable separator material as described above) are formed directly on an electrode, and another electrode is laminated or formed in situ atop the in situ formed separator, and so on. Materials may be deposited on the stack by processes including but not limited to deposition, spreading (e.g., blade spreading), printing, writing, or other suitable process. Further, a combination of laminating and depositing methods may be used to form the separator, e.g., wherein a woven or non-woven sheet is laminated and ionic conducting membrane precursor materials deposited for polymerization in situ.

Electrodes

Embodiments of the electrodes and electrode materials will be generally described with respect to various electrochemistries.

Metal-Air

Referring to FIG. 2A, for metal air electrochemical cells, the negative electrode or anode layer 102 generally comprises a metal constituent such as metal and/or metal oxides and a current collector. Optionally an ionic conducting medium is provided within the anode layer 102. Further, in certain embodiments, the anode layer 102 comprises a binder and/or suitable additives. Preferably, the formulation optimizes ion conduction rate, capacity, density, and overall depth of discharge, while minimizing shape change during cycling.

The metal constituent may comprise mainly metals and metal compounds such as zinc, calcium, lithium, magnesium, ferrous metals, aluminum, oxides of at least one of the foregoing metals, or combinations and alloys comprising at least one of the foregoing metals. These metals may also be mixed or alloyed with constituents including, but not limited to, bismuth, calcium, magnesium, aluminum, indium, lead, mercury, gallium, tin, cadmium, germanium, antimony, selenium, thallium, carbon, oxides of at least one of the foregoing metals, or combinations comprising at least one of the foregoing constituents. The metal constituent may be provided in the form of powder, fibers, dust, granules, flakes, needles, pellets, or other particles. In certain embodiments, granule metal, particularly zinc alloy metal, is provided as the metal constituent. During conversion in the electrochemical process, the metal is generally converted to a metal oxide.

The anode current collector may be any electrically conductive material capable of providing electrical conductivity and optionally capable of providing support to the anode layer 102. The current collector may be formed of various electrically conductive materials including, but not limited to, copper, brass, silver, carbon, ferrous metals such as stainless steel, nickel, carbon, electrically conducting polymer, electrically conducting ceramic, other electrically conducting materials that are stable in alkaline environments and do not corrode the electrode, or combinations and alloys comprising at least one of the foregoing materials. The current collector may be in the form of a mesh, perforated plate, metal foam, strip, wire, plate, or other suitable structure.

The current collector may be formed as a discrete layer within layer 102, integrally formed within the layer 107, or both. For example, the layer 102 may be a current collector in the form of a mesh, porous plate, metal foam, or other suitable structure having sites for the metal fuel material, with the metal fuel material integrally formed therein.

A negative electrode or anode may be laminated in the stack appropriate for the type of battery. Alternatively, anode materials may be deposited on the stack by processes including but not limited to deposition, spreading (e.g., blade spreading), printing, writing, or other suitable process. Further, a combination of laminating and depositing methods may be used to form the negative electrode or anode.

As will be described herein, the stacked cells and the methods of manufacture may be facilitated by providing conducting tabs extending from the anode layer 102 (or a separate layer adjacent thereto), which may be easily electrically connected after individual cells are sliced from the stack of layers.

Cathode 106 may comprise a conventional air diffusion cathode, for example generally comprising an active constituent and a carbon substrate, along with suitable connecting structures, such as a current collector. Typically, the cathode catalyst is selected to attain current densities in ambient air of at least 20 milliamperes per squared centimeter (mA/cm2), preferably at least 50 mA/cm2, and more preferably at least 100 mA/cm2. Of course, higher current densities may be attained with suitable cathode catalysts and formulations, and varying degrees of oxygen purity and pressure. The cathode 106 may be a bi-functional, for example, which is capable of both operating during discharging and recharging, or monofunctional (i.e., optimized for discharge or recharge). An exemplary air cathode is disclosed in copending, commonly assigned U.S. Pat. No. 6,368,751, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

The carbon used is preferably be chemically inert to the electrochemical cell environment and may be provided in various forms including, but not limited to, carbon flake, graphite, other high surface area carbon materials, or combinations comprising at least one of the foregoing carbon forms. The cathode current collector may be any electrically conductive material capable of providing electrical conductivity and optionally capable of providing support to the cathode 106. The current collector may be in the form of a mesh, perforated plate, metal foam, strip, wire, foil, plate, or other suitable structure. In certain embodiments, the current collector is porous to minimize oxygen flow obstruction. The current collector may be formed of various electrically conductive materials including, but not limited to copper, nickel, silver, carbon, nickel plated ferrous metals such as stainless steel, chromium, titanium and the like, and combinations and alloys comprising at least one of the foregoing materials. Suitable current collectors include porous metal such as nickel foam metal. For very high power applications, tungsten or tungsten alloys may be used as a current collector.

A binder is also typically used in the cathode 106, which may be any material that adheres substrate materials, the current collector, and the catalyst to form a suitable structure. The binder is generally provided in an amount suitable for adhesive purposes of the diluent, catalyst, an/or current collector. This material is preferably chemically inert to the electrochemical environment In certain embodiments, the binder material also has hydrophobic characteristics. Appropriate binder materials include polymers and copolymers based on polytetrafluoroethylene (e.g., polytetrafluoroethylene such as TEFLON ® powder or emulsions such as and TEFLON ® T-30 commercially available from E. I. Du Pont Nemours and Company Corp., Wilmington. Del.), sulfonic acid (e.g., perfluorinated polymers such as NAFION ® commercially available from E. 1. Du Pont Nemours and Company Corp.). polyvinyl alcohol (PVA), poly(ethylene oxide) (PEO), polyvinylpyrrolidone (PVP), polyvinylidene fluoride (PVDF), polyethylene fluoride (PEP), and the like, and derivatives, combinations and mixtures comprising at least one of the foregoing binder materials. However, one of skill in the art will recognize that other binder materials may be used.

The active constituent is generally a suitable catalyst material to facilitate oxygen reaction at the cathode 106. The catalyst material is generally provided in an amount suitable to facilitate oxygen reaction at the cathode 106. Suitable catalyst materials include, but are not limited to: manganese and its compounds, lanthanum and its compounds, strontium and its compound cobalt and its compounds, platinum and its compounds, and combinations comprising at least one of the foregoing catalyst materials.

A positive electrode or cathode may be laminated in the stack appropriate for the type of battery. Alternatively, cathode materials may be deposited on the stack by processes including but not limited to deposition, spreading (e.g., blade spreading), printing, writing, or other suitable process. Further, a combination of laminating and depositing methods may be used to form the positive electrode or cathode, e.g., laminate an integral current collector and deposit therein or thereon a carbon-catalyst mixture or matrix as described above.

Metal-Carbon ($MnO_2$)

A metal carbon battery may be manufactured according to the herein described methods. For example, a metal carbon battery may be formed in the configuration of FIG. 2B or 2C. In zinc based batteries, the anode or negative electrode generally comprises battery grade zinc material, as is conventionally known. Other metals may also be used for the anode, including but not limited to magnesium and aluminum. The cathode or positive electrode generally comprises manganese dioxide in a carbon matrix. Electrolytes used in these batteries may comprise solutions of ammonium chloride, zinc chloride, or a combination thereof.

Alkaline-$MnO_2$

Alkaline batteries may be manufactured according to the herein described methods. Typical alkaline batteries include a zinc powder or paste anode material. The cathode or positive electrode generally comprises manganese dioxide in a carbon matrix. Electrolyte, such as gelled KOH, may be incorporated in the anode material, provided in or on the separator, or a combination thereof.

Nickel-Zinc (Secondary or Primary Batteries)

Nickel zinc secondary batteries combine advantages of long-life nickel electrodes and the high capacity of zinc electrodes. These may take the general form or FIG. 2B or 2C The zinc material may comprise any of the materials described above with respect to metal air cells, using zinc as the prime metal constituent ingredient.

The positive nickel based electrode may be any known positive electrode used in nickel zinc, nickel cadmium, or nickel metal hydride batteries. For example, in a sintered design, a perforated or wire mesh nickel or nickel-plated steel substrate of is sintered with a carbonyl nickel powder layer or layers to form a porous electrode plaque. The resultant porous plaque is conventionally impregnated with a solution of an electrochemically active material precursor, typically nickel nitrate. The electrochemically active nickel hydroxide material is precipitated out of solution within the plate.

In addition, a high porosity nickel positive electrode can be utilized in which an electrochemically active nickel material may be incorporated in a porous substrate such as a highly porous metal foam or fibrous mat. For example, a slurry or paste containing the active material may be pressed on to and within interstices of the porous metal foam or fibrous mat substrate, and subsequently compacted to a desired thickness to form a positive nickel electrode.

Lithium Cells

Lithium batteries may be manufactured according to the herein described methods. Lithium batteries use a lithium material as the anode or negative electrode. The cathode or positive electrode may be a solid cathode such as a manganese dioxide based material, carbon monofluoride, silver chromate, silver vanadium oxide, copper oxide, or iron disulfide. Alternatively, the cathode or positive electrode may comprise a soluble cathode, such as sulfur dioxide (e.g., dissolved in an organic electrolyte solvent) or oxychlorides (e.g., $SOCl_2$ and/or $SO_2Cl_2$).

Electrolyte

The electrolyte generally comprises ion conducting material to allow ionic conduction between the metal anode and the cathode. An ion conducting amount of electrolyte is provided in the stack and/or within electrode material.

In alkaline cell systems, the electrolyte may comprise ionic conducting materials such as KOH, NaOH, LiOH, RbOH, CsOH other materials, or a combination comprising at least one of the foregoing electrolyte media. In many alkaline batteries and metal air cells, a preferred hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 45% ionic conducting materials.

In acidic systems, the proton may come from an aqueous acidic electrolyte solution, such as a solution of perchloric acid, sulfuric acid, hydrochloric acid, or combinations thereof. The concentration of perchloric acid, for example, preferably ranges from about 0.5 wt. % to about 70 wt. %, and most preferably about 10 wt. % to about 15 wt. %.

In neutral systems, an electrolyte solution may include a saturated aqueous neutral solution of ammonium chloride, potassium sulfate, sodium chloride; and any combination comprising at least one of the foregoing.

The electrolyte may be added to the system by a variety of techniques. Cells may be formed by the herein described methods as sealed cells, where free-flowing electrolyte solution (e.g., in liquid or gelatinous form) is incorporated in the cell. Further, as described above, the electrolyte may be incorporated in the separator. Still further, electrolyte, for example, in a gelatinous form, may be incorporated in the anode and/or cathode, depending on the type of battery system.

Still further, batteries may be formed wherein active electrolyte is not provided, for example suitable as a reserve battery. The electrolyte may be a water activated electrolyte, e.g., provided in a dry or concentrated form. Alternatively, a porous material or structure may be formed (e.g., as described herein with respect to layer 107) adapted to receive electrolyte liquid or gel. For example, a porous ionically conductive polymer may be formed in the stack of layers 100 intended to receive electrolyte upon activation of the cell. In this manner, self-discharge, as well as cathode flooding, well known problems with cells such as metal air electrochemical cells, are minimized or eliminated.

Inter-Cell Layer

As mentioned above, certain cells use an inter-cell layer, shown as layer 107 in FIG. 2A and layer 307 in FIG. 2C. These layers may serve to provide fluid flow (e.g., air flow in metal air cells) in combination with electrical insulation or electrical conduction, depending on the cell configuration. Also as mentioned above, layer 307 may be a solid layer (e.g., not providing air flow) in combination with electrical insulation or conduction, depending on the cell configuration. Further, the inter-cell layer may serve as a passageway for introducing electrolyte, for example in a reserve battery.

Figure 3D:
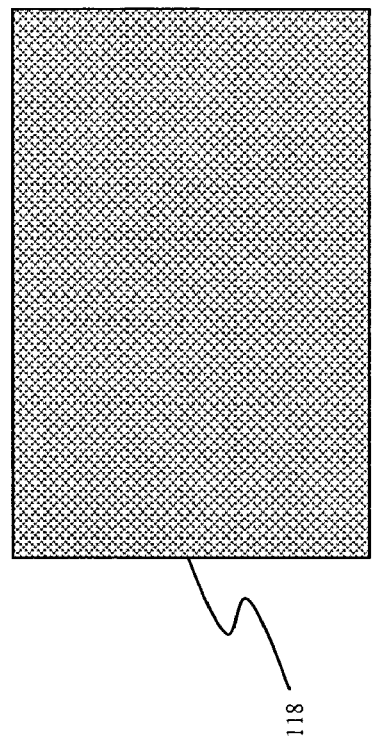
FIG. 3D shows an interconnecting layer between adjacent cells including porous insulating material.
Figure 3A:
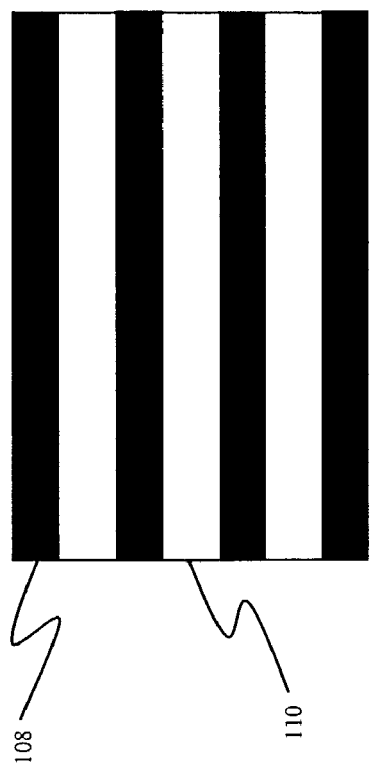
FIG. 3A shows an interconnecting layer between adjacent cells including alternating conductor portions and channel portions.

In one embodiment of a metal air electrochemical cell, and referring now to FIG. 3A, layer 107 comprises alternating electrical conductor portions 108 disposed in electrical contact with the cathode layer 106 of one cell and the anode layer 102 of an adjacent cell, and air channel portions 110. The air channel portions 110 are provided to allow air access to the air cathode.

To maintain structural integrity of the stack during processing, the air channel portions 110 may be filled with a removable substance. For example, the air channel portions 110 may be filled with water, liquid $CO_2$, or other suitable substance, whereupon the stack of layers is frozen during the stacking and cutting processes. Alternatively, another filler material capable of melting without destruction to the cells, may be incorporated in the air channel portions 110, whereupon the stack of layers is supported during the stacking process, and the filler material may be melted away at any stage thereafter, for example, by heat, light, or other exposure, such as etching, peeling (e.g., where adhesive is selected that only adheres with the removable substance, and removable substance may be peeled from layer—suitable lubricant, etc., should be used).

In another example of a suitable layer 107 for a metal air electrochemical cell, and referring now to FIG. 3B, a mixed conductive/air flow layer 112 is provided. The mixed conductive/air flow layer 112 comprises a porous conductive material providing electrical contact between the cathode layer 106 of one cell and the anode layer 102 of an adjacent cell.

To maintain structural integrity of the stack during processing, the air channel portions 110 may be filled with a removable substance. For example, the porous substrate 112 may be filled with water, liquid $CO_2$, or other suitable substance, whereupon the stack of layers is frozen during the stacking and cutting processes. Alternatively, a sinterable material may be incorporated in the porous substrate 112, whereupon the stack of layers is supported during the stacking process, and the sinterable material may be sintered off at any stage thereafter.

To provide desired air flow, for example in metal air cells, a porosity gradient may be provided in the layer 107. For example, the pores of the layer 107 may decrease in the direction from the anode side of the layer 107 (e.g., wherein a suitable barrier is provided on the anode) to the cathode side of the layer. Alternatively, a gradient may be established from the edges of the cell to the center, for example, to allow consistent air flow toward the center of the adjacent electrode. Gradients may be formed by varying the concentration of the sinterable material, for example, in successive sub-layers (for variations along the height of the layer 107) or across the layer 107 (for gradient variations in a direction generally parallel to the layer plane).

The conductive materials may include any of the current collector materials described above, for example with respect to metal air cell electrodes, such as carbon, nickel, stainless steel, brass, or the like. The meltable material may include, for example, polymers having melting/boiling points<<than conductive material, such as poly vinyl alcohol (PVA). PVA may also be used as the sinterable material.

In metal air electrochemical cells connected in parallel or in "alternative" series, electrical connection will be effectuated solely through the externally extending current collectors, as described further herein, rather than via utilization of the layer 107 as an electrical conducting layer. As used herein, alternative series connections refer to those connected external to the cell, as opposed to those using electrical connection in the inter layer 107.

Figure 3C:
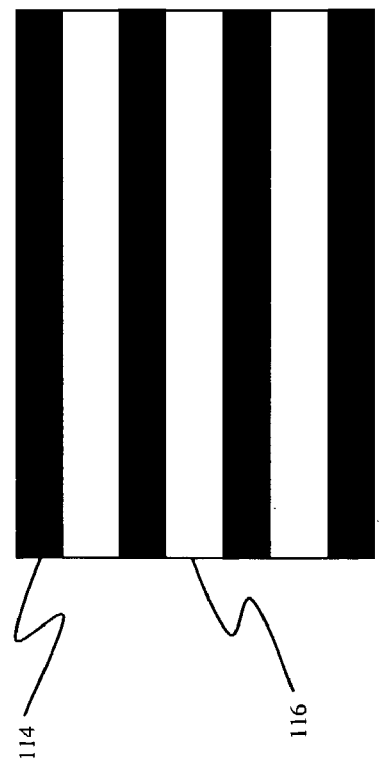
FIG. 3C shows an interconnecting layer between adjacent cells including alternating insulating portions and channel portions.

In one embodiment of a metal air electrochemical cell, and referring now to FIG. 3C, layer 107 comprises alternating insulator portions 114 between the cathode layer 106 of one cell and the anode layer 102 of an adjacent cell, and air channel portions 116. The air channel portions 116 are provided to allow air access to the air cathode.

In another example of a suitable layer 107 for a metal air electrochemical cell, and referring now to FIG. 3D, a mixed insulative/air flow layer 118 is provided. The mixed insulative/air flow layer 118 comprises a porous insulating material providing electrical insulation between the cathode layer 106 of one cell and the anode layer 102 of an adjacent cell.

The insulating material may comprise any known electrically insulating plastic or polymer, ceramic, or glass materials. Further, in certain embodiments, conventional separator or separator material may be used to form the insulating layer.

Capacitor/Supercapacitor

Other types of electrochemical cell that may benefit from the herein described manufacturing process include energy storage capacitors. These may be standard capacity capacitors, or supercapacitors.

The stacked layers may be formed into symmetrical capacitors, generally including two identical or substantially identical electrodes—thus, in one embodiment, the electrodes (302 and 306, or 202) are substantially identical. According to one embodiment of an electrode of the present invention, the electrodes generally comprise high surface area active material and hydrogel material.

According to another embodiment, the electrodes generally comprises Faradic psuedocapacitance materials and hydrogel material.

According to another embodiment of the present invention, the electrodes generally comprises high surface area active material, Faradic psuedocapacitance materials and hydrogel material. Thus, the electrodes are hybrid electrodes, each exhibiting both Faradic psuedocapacitance and double layer capacitance properties.

The stacked layers may be also formed into asymmetrical capacitors generally including two different electrodes. According to one embodiment, one electrode (102 or alternating electrodes 202) generally comprises high surface area active material and hydrogel material. The alternate electrode (306 or alternating electrodes 202) may comprise a conventional psuedocapacitance type electrode, a psuedocapacitance electrode described herein, or a hybrid electrode (exhibiting both Faradic psuedocapacitance and double layer capacitance properties).

According to another embodiment, one electrode (302 or alternating electrodes 202) generally comprises Faradic psuedocapacitance materials and hydrogel material. The alternate electrode (306 or alternating electrodes 202) may comprise a conventional double layer capacitance type electrode, a double layer capacitance electrode described herein, or a hybrid electrode (exhibiting both Faradic psuedocapacitance and double layer capacitance properties).

According to another embodiment, one electrode (302 or alternating electrodes 202) generally comprises high surface area active material, Faradic psuedocapacitance materials and hydrogel material, forming a hybrid electrode, exhibiting both Faradic psuedocapacitance and double layer capacitance properties. The alternate electrode (306 or alternating electrodes 202) may comprise a conventional double layer capacitance type electrode, or double layer capacitance electrode described herein, a conventional psuedocapacitance type electrode, a psuedocapacitance electrode described herein, a conventional hybrid electrode, or a hybrid electrode described herein.

According to another embodiment of an electrode of the present invention, one electrode (302 or alternating electrodes 202) generally comprises hydrogel material impregnated into a foam or sponge structure of one or more Faradic psuedocapacitance materials (e.g., lead, nickel, or any of the Faradic psuedocapacitance materials described herein). The alternate electrode (306 or alternating electrodes 202) may comprise a conventional double layer capacitance type electrode, or double layer capacitance electrode described herein, a conventional psuedocapacitance type electrode, a psuedocapacitance electrode described herein, a conventional hybrid electrode, or a hybrid electrode described herein.

According to another embodiment of an electrode of the present invention, one electrode (302 or alternating electrodes 202) generally comprises hydrogel material and Faradic psuedocapacitance material impregnated into a foam or sponge structure of one or more Faradic psuedocapacitance materials (e.g., lead, nickel, or any of the Faradic psuedocapacitance materials described herein). The alternate electrode (306 or alternating electrodes 202) may comprise a conventional double layer capacitance type electrode, or double layer capacitance electrode described herein, a conventional psuedocapacitance type electrode, a psuedocapacitance electrode described herein, a conventional hybrid electrode, or a hybrid electrode described herein.

Faradic psuedocapacitance materials include, but are not limited to, nickel, copper, cadmium, zinc, titanium, silver, indium, selenium, tellurium, gallium, ruthenium, rhodium, palladium, osmium, iridium, cobalt, lead, manganese, iron, platinum, tantalum, molybdenum, tungsten, vanadium, electrically-conductive alloys, oxides, hydroxides, nitrides, and carbides of the same, metal hydride materials of AB2 or AB5 type, doped conducting polymers, and combinations comprising at least one of the foregoing.

High surface area active materials include, but are not limited to: carbon (including but not limited to, graphite, activated carbon fibers, carbon black, active carbon, carbon fibers, carbon gel, skeleton carbon, mesocarbon, microbeads and combinations comprising at least one of the foregoing types of carbonaceous material) generally having surface areas greater than about 100 meters squared per gram, preferably greater than about 1000 meters squared per gram; and high surface area polymeric materials (e.g., high surface area polyaniline) generally having surface areas greater than about 100 meters squared per gram, preferably greater than about 1000 meters squared per gram.

The hydrogel is used as an electrolyte in an integral matrix with either or both the high surface area active materials and the Faradic psuedocapacitance materials. In particular, the hydrogel comprises materials that are macroscopically no aqueous, but on a microscopic level, an aqueous solution of a desired ionic species is supported in the polymer matrix of the hydrogel material.

The integral electrode material (high surface area active materials and/or Faradic psuedocapacitance materials) and hydrogel may be formed by various techniques. In one embodiment, electrode material is mixed with monomer solution to form a colloid or slurry. This colloid or slurry may then by polymerized with the electrode materials in situ by thermal or UV radiation. Alternatively, in another embodiment, electrode material is mixed with a partially polymerized solution of monomer and polymer to form a colloid or slurry. In still another embodiment, a hydrogel polymer may be mixed with the electrode material to form a "wet sand" type of material (such a material is described with respect to a metal fuel material in U.S. patent application Ser. No. 10/283,016 entitled "Metal Air Electrochemical Cell and Anode Material for Electrochemical Cell" by Wilson et al. filed on Oct. 29, 2002, now abandoned.

With any of the above techniques, electrodes may be formed in a continuous or batch process. For example, batch slurries of electrode material and hydrogel material may be formed and subsequently shaped into electrodes and formed into a capacitor (e.g., including a separator and current collectors) as in known (e.g., in prismatic configuration or spiral wound configuration).

Alternatively, a continuous process may be used to form the electrodes and/or an electrochemical capacitor. For example, U.S. Pat. No. 6,368,751, entitled "Electrochemical Electrode For Fuel Cell", to Wayne Yan and Tsepin Tsai, which is incorporated herein by reference in its entirety, discloses a carbon based electrode firmed integrally with a metal sponge current collector. Variation of this process may be used herein. In one variation, hydrogel material may be integrally formed in the porous sponge or foam metal material, and subsequently cured, essentially forming a Faradic psuedocapacitance capacitor. In another variation, a shiny, colloid, or mixture (e.g., wet sand" a described above) of a hydrogel material (e.g, in monomer solution or polymer form) and electrode material may be integrally formed in the porous sponge or foam metal material, and subsequently cured, essentially forming either a Faradic psuedocapacitance electrode or a hybrid electrode. In a continuous manner, the material is incorporated into and optionally sintered to form an integral electrode including active material and electrolyte material. These electrodes, having foam or sponge material as current collector with hydrogel or hydrogel-electrode material combinations integral therein, advantageously decrease contact resistance between the active materials and the current collector, and further enhance mechanical integrity. To enhance processing and stackability of these electrodes, a film may be integrated (e.g., to maintain each layer in isolation) on one surface of the foam-this film may he a separator, such that an electrode-separator-electrode sandwich may be readily fabricated. Alternatively, this film may be a divider, essentially to maintain each electrode in isolation, so that multiple electrode can be fabricated in a single operation. One suitable type of monomer solution, particularly for aqueous solutions, comprises one or more monomers selected from the group of water-soluble, ethylenically-unsaturated acids and acid derivatives and a second type monomer, generally as a crosslinking agent. Further, the solution may include a water-soluble or water-swellable polymer, which acts as a reinforcing element. In addition, a chemical polymerization initiator may optionally be included. Such water holding polymer materials are described: with respect to separators in electrochemical cells, in U.S. Pat. No. 6,605,391, entitled "Solid Gel Membrane", by Mugue Chen, Tsepin Tsai, Wayne Yac, Yuen-Ming Clung, Lin-Feng Li, and Toni Karen, filed on Feb. 26, 1999; U.S. Pat. No. 6,358,651 entitled "Solid Gel Membrane Separator in Rechargeable Electrochemical Cells", by Miigno (Then, Tsepin Tsai and Lin-Feng Li, filed Jan. 11, 2000; U.S. Ser. No. 09/943,053 entitled "Polymer Matrix Material", by Robert Callahan, Mark Stevens and Mugno Chen, filed on Aug. 30, 2001; now abandoned and U.S. Pat. No. 6,849,702 entitled "Electrochemical Cell Incorporating Polymer Matrix Material", by Robert Callahan, Mark Stevens and Mugno Chen, filed on Aug. 30, 2001; all of which are incorporated by reference herein in their entireties.

One suitable type of monomer solution, particularly for aqueous solutions, comprises one or more monomers selected from the group of water-soluble, ethylenically-unsaturated acids and acid derivatives and a second type monomer, generally as a crosslinking agent. Further, the solution may include a water-soluble or water-swellable polymer, which acts as a reinforcing element. In addition, a chemical polymerization initiator may optionally be included. Such water holding polymer materials are described: with respect to separators in electrochemical cells, in U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. Pat. No. 6,358,651 entitled "Solid Gel Membrane Separator in Rechargeable Electrochemical Cells", by Muguo Chen, Tsepin Tsai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties.

This hydrogel solution may be formed with the ionic species in situ, or alternatively the hydrogel solution may be formed with water as a space holder, (as described in U.S. patent application Ser. No. 09/943,053 entitled "Polymer Matrix Material"), wherein a desired ionic species is subsequently used to replace the water (i.e., the water acts as a space holder to maintain mechanical integrity of the polymer matrix material).

The separator in a capacitor may comprise any commercial available separator such as those used for batteries and described above.

Capacitor/Flow Through

Still further types of cells that may benefit from the herein described manufacturing methods include flow through capacitors, such as those used for deionization of fluids (e.g., water desalinization).

Referring to FIG. 2A, embodiments of flow through capacitors formed form the stacked layers are described. Fluid generally flows through layers 107, described herein.

A symmetrical flow through capacitor generally includes two identical or substantially identical electrodes—thus, in one embodiment, electrodes 102 and 106 are substantially identical. According to one embodiment of an electrode of the present invention, electrodes 102 and 106 generally comprise high surface area active material. According to another embodiment of an electrode of the present invention, electrodes 102 and 106 generally comprises high surface area active material and hydrogel material.

An asymmetrical flow through capacitor generally includes two different electrodes. According to one embodiment of an electrode of the present invention, electrode 102 generally comprises high surface area active material. Electrode 106 may comprise a different quantity (e.g., layer thickness) of high surface area active material. According to another embodiment of an electrode of the present invention, electrode 102 generally comprises high surface area active material and hydrogel material. Electrode 106 comprises a different quantity (e.g., layer thickness) of high surface area active material and hydrogel material.

The materials may be similar to those described above with respect to other types of capacitors.

Substantially planar electrodes may be used (e.g., without channels), wherein fluid flows through channels formed in an insulating or conducting layer 107.

A flow through capacitor may be formed in series. In one embodiment, and referring now to FIG. 3A, layer 107 comprises alternating electrical conductor portions 108 disposed in electrical contact with the positive electrode layer 106 of one cell and the negative electrode layer 102 of an adjacent cell, and fluid channel portions 110. The fluid channel portions 110 are provided to allow fluid access to the electrode, e.g., for water deionization.

To maintain structural integrity of the stack during processing, the fluid channel portions 110 may be filled with a removable substance, as described above with respect to the inter-cell layer in certain batteries. A removable substance may be incorporated in the fluid channel portions 110, whereupon the stack of layers is supported during the stacking process, and the removable substance may be eliminated at any stage thereafter, for example, by heat, light, or other exposure, such as etching, peeling (e.g., where adhesive is selected that only adheres with the removable substance, and removable substance may be peeled from layer—suitable lubricant, etc., should be used).

In another example of a suitable layer 107, and referring now to FIG. 3B, a mixed conductive/fluid flow layer 112 is provided. The mixed conductive/fluid flow layer 112 comprises a porous conductive material providing electrical contact between the positive electrode layer 106 of one cell and the negative electrode layer 102 of an adjacent cell. Note that a porosity gradient may be formed as described above.

In both parallel and alternative series connections, electrical connection will be effectuated solely through the externally extending current collectors, as described further herein, rather than via utilization of the layer 107 as an electrical conducting layer.

In one embodiment, and referring now to FIG. 3C, layer 107 comprises alternating insulator portions 114 between the positive electrode layer 106 of one cell and the negative electrode layer 102 of an adjacent cell, and fluid channel portions 116. The fluid channel portions 116 are provided to allow air access to the air cathode.

In another example of a suitable layer 107, and referring now to FIG. 3D, a mixed insulating/fluid flow layer 118 is provided. The mixed insulating/fluid flow layer 118 comprises a porous insulating material providing electrical contact between the positive electrode layer 106 of one cell and the negative electrode layer 102 of an adjacent cell.

Alternatively, in lieu of separate inter-cell layers, channels may be formed directly in the electrodes. For example, during manufacture, these channels may be supported with a removable substance as described with respect to layer 107, whereupon after assembly of the stack (and/or after slicing of cells from the stack), a removable substance is eliminated.

Detail of Kerf Regions

Figures 4A, 4B, 4C:
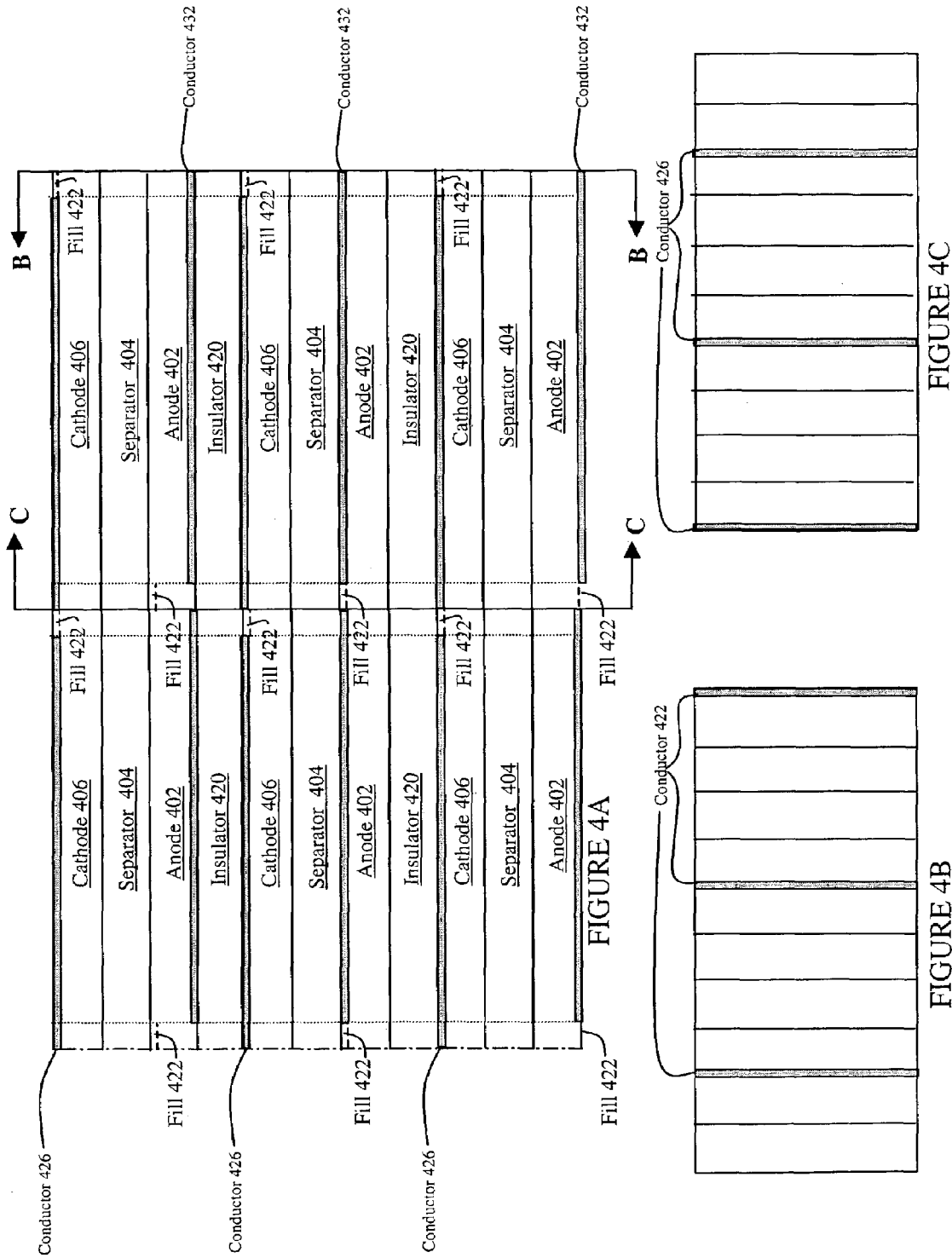
FIG. 4A shows a sectional view of a laminar assembly generally having alternating layers of cathode, separator, anode and insulator, with current collectors associated with each cathode and current collectors associated with each anode provided with fill regions for efficient manufacturing.
FIGS. 4B and 4C show sectional views along the lines B-B and C-C in FIG. 4A.

Referring now to FIG. 4A, a laminar assembly 400 includes a plurality of alternating layers of cathode 406, separator 404, anode 402 and insulator 420. The conductors or current collectors 426 are associated with each cathode 406, and conductive or current collectors 432 are associated with each anode 402. In order to allow for efficient manufacturing of arrangements of plural electrochemical cells, fill regions 422 are provided, which may be filled with a suitable removable substances, wherein the substance is removed after either assembly of the plural laminar cells, or after slicing of the laminar cells into individual electrochemical cells arrangements. For example, the laminar assembly may be assembled at a temperature below the freezing point of the removable substance (e.g., water, $CO_2$). In this manner, and as shown in FIGS. 4B and 4C, conductors 432 and 426 remain exposed to facilitate the desired electrical connection arrangement. For example, for a series arrangement, conductors 422 and 426 of adjacent electrochemical cells may be electrically connected. In series arrangements, it may be desirable to position conductors 422 and 426 such that they are exposed on the same side is (not shown). Alternatively, in a parallel arrangement, the plural conductors 422 of a plurality of electrochemical cells may be electrically connected, and the plural conductors 426 of a plurality of electrochemical cells may be electrically connected, thereby forming a parallel stack of electrochemical cells. In this manner, electrical connection can be facilitated without a pre-connection grinding step. Further, the likelihood of electrical shorts in the cell are minimized or eliminated.

Referring now to FIG. 4D1, one embodiment of a position and configuration for the fill regions 432, or kerf regions, is shown. In this embodiment, the laminar stack 400 is intended to be sliced to form two substantially identical electrochemical cells. Referring to FIG. 4D2, the kerf is positioned to form 2 electrochemical cells of different current levels and/or capacities. Referring now to FIG. of 4D3, are configured and positioned to provide four substantially similar electrochemical cells. Referring now to FIG. 4D4, the kerfs are positioned to form two rectangular shaped electrochemical cells, and one T-shaped electrochemical cell, for instance, for a special application electrochemical cell (e.g., wherein the power source must fit within a predefined space).

In another embodiment, a portion of the kerf region may include a suitable material to form a cell housing, while still exposing the current collectors. For example, when the kerf regions are patterned, a suitable plastic material can be deposited on the outside portions of the kerf region (e.g., at the distal ends of a layer between components in the same plane) are partially fill with suitable plastic material. Use of a mold structure may be desired to form a portion of the cell housing.

It should be apparent upon reading of the present disclosure that a variety of configurations of electrodes, separators, insulators, and/or conducting layers may be provided in the manufacturing methods herein. In for example, in some types of electrochemical cells, each cell should be discrete, whereby insulator layers are provided. Even in the discrete types of cells, variations may be had, for instance, a single anode layer may be used with a pair of cathode layers, or alternatively a pair of anode layers may be used with a single cathode layer. Further, certain electrochemical cell arrangements may benefit from a separate or integral conductive layer electrically connecting adjacent electrochemical cells. This may be useful, for example, a certain series arrangement of electrochemical cells.

Further, some types of cells may be formed in a continuous stack, e.g., alternating electrode/separator/electrode/separator, wherein the electrodes may be the same or different.

It should be understood that the benefits of various arrangements are based on known principles. For instance, a pair of very thin and consumable anode layers may be useful with a single cathode layer for applications requiring very fast discharge. Alternatively, a single relatively thick anode may be used with a pair of cathodes, for instance, where higher capacity applications are required. Of course, various modifications and alternatives will be apparent upon reading this disclosure.

Figure 5A:
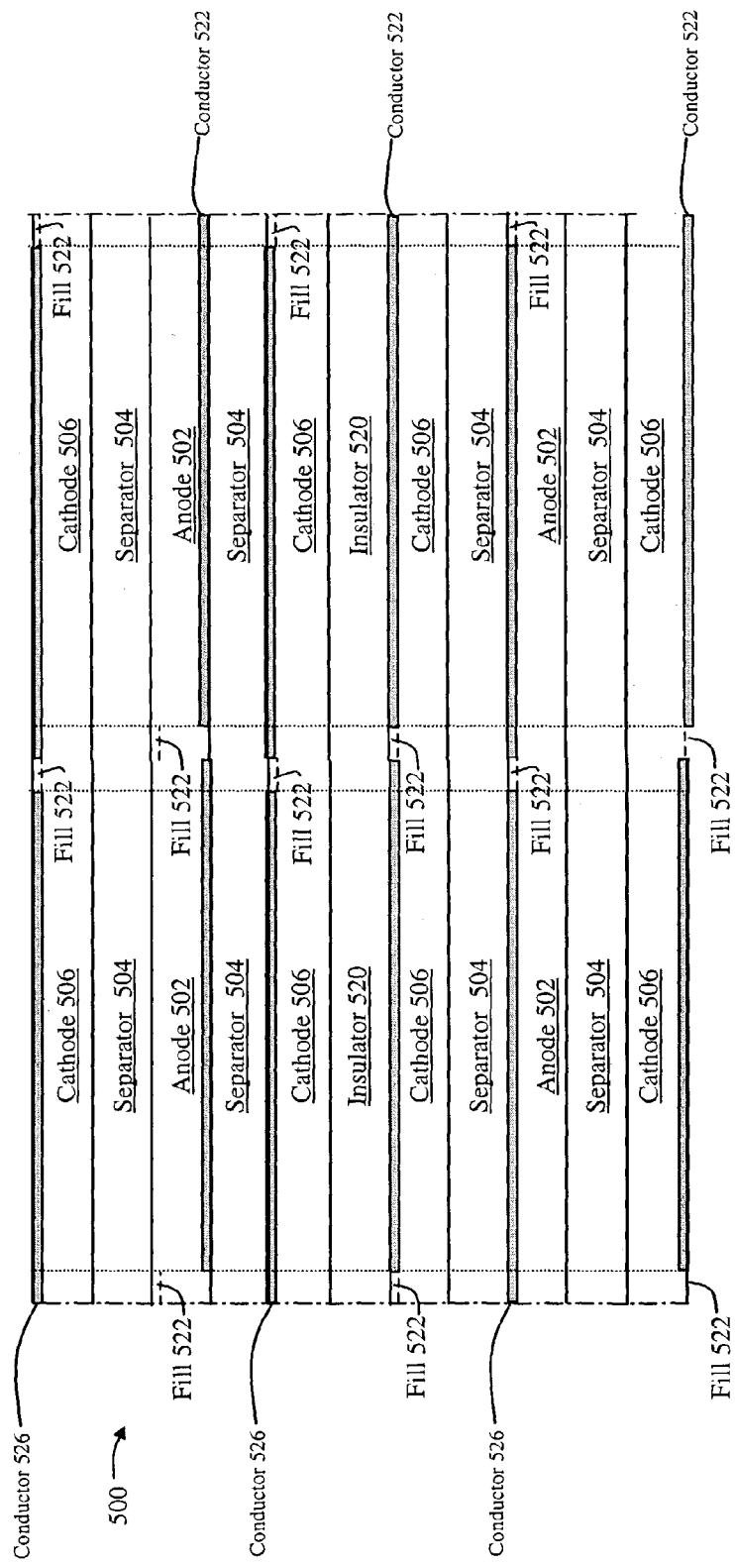
FIG. 5A shows a sectional view of a laminar assembly of electrochemical cell(s) including alternating layers of a first cathode, a first separator, an anode, a second separator and a second cathode, each cell divided with a layer that may isolate the cells or provide common air or fluid flow to adjacent cathodes.

Referring now to FIG. 5A, a laminar assembly 500 is depicted, generally wherein each electrochemical cell comprises a pair of cathode layers and an anode layer electrically separated by separators. Specifically, the laminar assembly 500 includes alternating layers of a first cathode 506, a first separator 504, an anode 502, a second separator 504 and a second cathode 506, wherein each cell is generally in isolation by an insulator 520. Alternatively, the insulator 520 may provide common air or fluid flow to adjacent cathodes. The conductors 526 and 522 may be electrically connected, for example, similar to the description above with respect to FIGS. 4B and 4C. Further, the fill regions 532 may serve the same purposes described above with respect to FIG. 4A. Therefore, in this embodiment, a pair of cathodes 506 are associated with each anode 502, for example, for applications requiring high depth of discharge and/or high capacity.

Figure 5B:
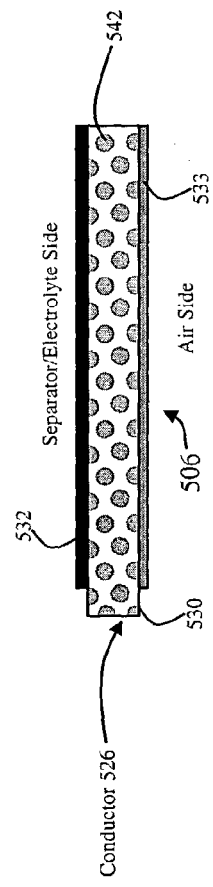
FIG. 5B shows an example of a positive electrode useful in certain embodiments of the present invention.

The positive electrodes used herein may be formed, e.g., according to a structure shown in FIG. 5B. As shown in FIG. 5B, an example of a cathode 506 of a cell stack 500 includes a particulate microstructure reinforced by relatively strong bonding provided by sintering a polymeric binder particulate 542 within the three-dimensional interconnected porosity of a metal foam substrate 530. The binder particulate 542 is impregnated within the three-dimensional porous substrate 530. The substrate 530, including the polymeric binder particulate 542 is squeezed by any suitable known means, such as conventional roll pressing. A reactive layer 532 and a microporous layer 533 then may be applied utilizing any suitable means such as conventional coating operations or additional roll pressing steps.

The reactive (or gas diffusion) layer 532, as well as the binder particulate 542, are preferably fabricated from the same materials. In particular, these materials may include a hydrophobic polymeric binder applied as a liquid, i.e., a dispersion, suspension or slurry, to the surfaces of substrate 30. Examples of such suitable hydrophobic polymeric binders include polytetrafluoroethylene (PTFE) and fluorinated ethylene-propylene copolymer (FEP). Other useful materials include halocarbons such as polychlorofluoroethylene. Mixtures of these resins may also be utilized.

In a preferred embodiment, the hydrophobic polymeric binder is combined with particulate carbon. This combination is provided by blending the particulate carbon with either a liquid dispersion of finely-divided dry hydrophobic polymer, or with the polymer in dry powder form. The polymer preferably includes about 20 to about 60 weight percent (wt. %) of the blend. This range generally provides sufficient polymer to bind substantially all of the carbon particles, without unduly reducing gas porosity or otherwise lowering electrochemical performance.

Moreover, the carbon particles are preferably catalyzed by any number of well-known catalysts applied to the carbon in a manner well-known to those skilled in the art. Examples of such suitable catalysts include magnesium oxide ($MnO_2$), silver nitrate, platinum, cobalt oxide, and combinations thereof.

Figure 6:
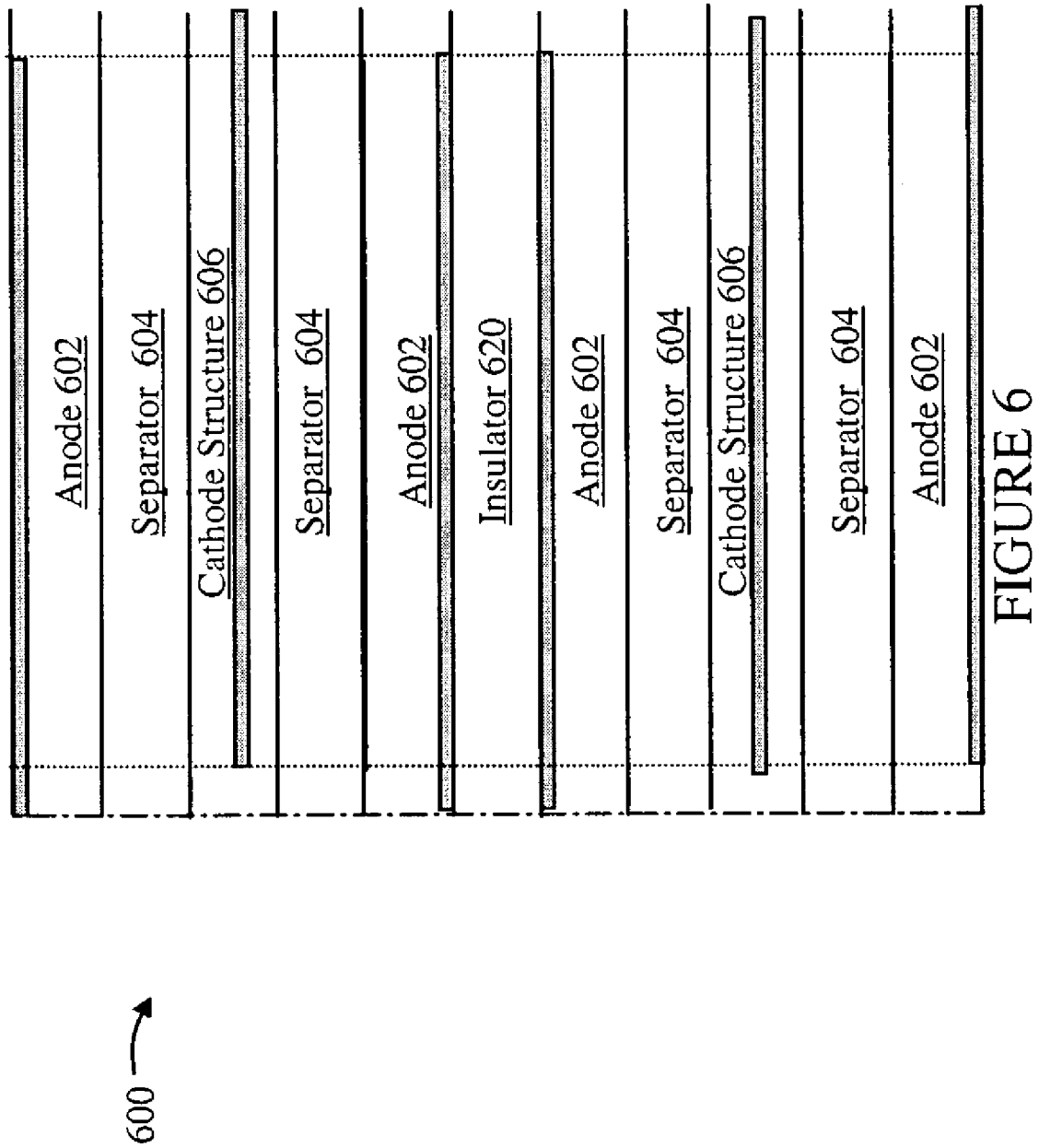
FIG. 6 shows a sectional view of a laminar assembly of discrete electrochemical cells.

Referring now to FIG. 6, another alternative depiction of laminar assembly 600 is provided. In the assembly 600, each electrochemical cells is discrete, and includes a first anode 602, a first separator 604, a cathode structure 606, a second separator 604 and a second anode 602. Notice that in this embodiment, the cathode structure 606 generally includes a current collector having cathode material on both sides thereof, so that both anodes 602 of each electrochemical cells may electrochemically reacts with the respective sides of the cathode structure 606. This configuration is useful, for example, for high discharge rate applications, particularly wherein the anodes 602 are formed relatively thin for very fast discharge.

Manufacturing Techniques

Figure 8:
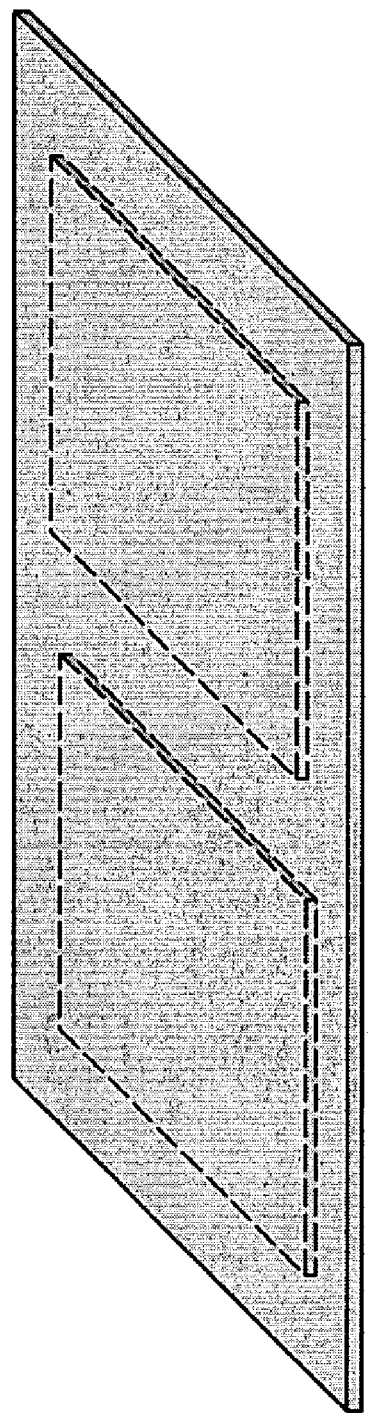
FIG. 8 shows another exemplary method of manufacturing the layers described herein.

Depending on the type of electrochemical cell, and the material used for the cell, various methods may be used to manufacture the laminar assemblies described herein. For example, as shown in FIG. 8, the components may be layered on a large substrate or support surface, and subsequently laminated atop one another. Layers (e.g., in forms of sheets or rolls) may be bonded as described further herein.

It should also be noted that the planar surface area of the sheets or layers may be very large, for mass manufacture of several dozen, hundreds, thousands, or more, especially in continuously formed laminar structures. As described above, individual cells or cell stacks may be defined by suitable fill regions, e.g., as described with respect to FIGS. 4A and 5A above. The cells or cell stacks can then be cut, and in certain embodiments current collectors expose with minimal or no further processing. This may substantially reduce costs of manufacture for many electrochemical cells and cell systems.

Alternatively, layers may be deposited directly atop one another. Materials may be deposited on the stack by processes including but not limited to deposition, spreading (e.g., blade spreading), printing, writing, or other suitable process. Further, a combination of laminating and depositing methods may be used to form components, e.g., wherein a substrate is laminated and active material or the like is deposited.

The thickness of each layer may vary, depending on numerous factors including but not limited to the type of cell, the desired power rating, the desired energy rating, the manner in which the cell is formed, or any combination including these factors. For example, using writing, printing and deposition techniques, layers on the order of microns or even nanometers are possible. With other depositing techniques, layers on the order of microns or millimeters may be provided.

Using laminating techniques, very thin layers (e.g., on the order of microns) may be formed using processes similar to those used in, e.g., silicon processing, e.g., as described in PCT Application No. PCT/US02/15864 filed May 20, 2002 entitled "Thin films and Production Methods Thereof", which is incorporated herein by reference. As described therein, a thin layer to be processed (e.g., have a useable structure formed therein or thereon, in this case, electrodes, current collectors, channels, porous regions) is selectively bonded to a substrate layer. That is, regions of the thin layer not intended to be processed are bonded to the substrate, and regions of the thin layer intended to be processed are bonded at a weaker bond strength (or in some embodiments not bonded at all) than the other regions. Accordingly, very thin layers may be formed and laminated atop other layers or a starting substrate to form the stacked laminar structure of plural electrochemical cells as described herein.

Additionally, layers may be formed on the scale of centimeters, by laminating according to methods known in the art, including the novel features of the present invention such as defining kerf regions at the peripheries of the cells, e.g., using removable substances to create air channels, and providing cells with conducing structures readily connectable.

Where channels and/or kerf regions are to be formed, the removable substance may be filled into the spaces on the layer (e.g., for channels) or at intended cut lines (e.g., corresponding to separate electrochemical cells). Accordingly, if the slicing and/or stacking is to be performed at temperatures below that of the removable substance, suitable end structures or molds should be in place to prevent premature leakage of the removable substance. In this manner, several cells, several dozen cells, several hundred cells, or even several thousand cells may be stacked. If it is desired to limit the height of each stack, a designated insulating layer may be provided, which will be later cut. Alternatively, this designated layer may be formed with a removable substance, such that after stacking and slicing operations, the removable substance is removed (e.g. by melting or otherwise) and the discrete stacks may easily be separated from one another.

Figure 7:
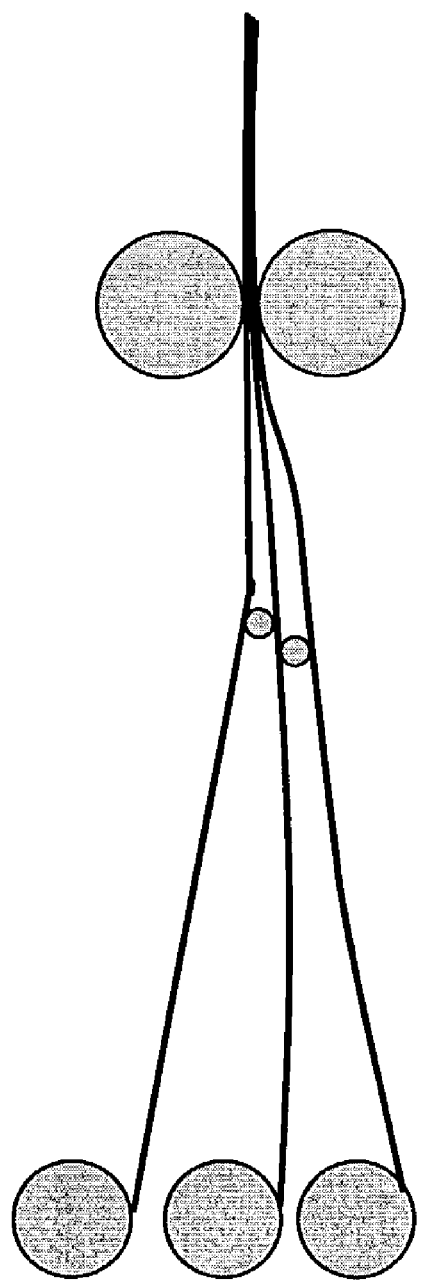
FIG. 7 shows one exemplary method of manufacturing the layers described herein.

In another method of manufacturer, each electrochemical cells layer may be separately formed, for example as shown in FIG. 7, by a plurality of roller structures. Each of the cells may then be laminated together by other roller structures, or alternatively stacked as described above.

Bonding between the layers may be accomplished with adhesives, heat bonding techniques, pressure bonding techniques, or a combination thereof.

Alternatively, the layers may be formed in situ, whereupon subsequent layers are deposited or spread (e.g., doctor's blade methods) atop one another.

In all of the above methods, it may be desirable to provide aligning steps at each layer, set of layers, or for each set of layers comprising one or more cells. For example, alignment marks may be provided on each layer and visually aligned (manually) or optically (with suitable reflecting or transmitting alignment marks, or other detectable marks). Mechanical alignment may also be used, e.g., wherein "keys" and corresponding "keyholes" are formed on each layer, set of layers, or for each set of layers comprising one or more cells. These and other alignment systems should be apparent to one skilled in the art.

Cutting the laminar assembly is generally normal to the plane of stack at the kerf regions to expose the current collectors. Alternatively, a stack may be formed with multiple cells stacked atop one another, whereby a dedicated kerf layer is formed, so that cells may be cut parallel to the plane of the stack, or the cells may be cut across a common layer (e.g., cut through a thick electrode, wherein the cut electrode portions are used for both cells.

To form a battery of a desired current output level, the stack of layers may be cut into areas corresponding with the desired current output level. In this manner, various current output level batteries may be fabricated from the same stack of layers, merely by slicing the stack into a desired electrode surface area. This is represented in FIG. 1, for example, with areas A1, A2 and A3, which are different areas correspondingly having different current output levels.

In another battery configuration, a hybrid system may readily be provided. For example, a first type cell or set of first type cells may be provided at one level of the stack of cells, and a second type cell or set of second type cells may be provided at another level of the stack of cells. The first and second types may be different battery chemistries, different thicknesses (e.g., to provide a high power section of thin electrodes and a high energy section with relatively thicker electrodes), or other desired configuration.

While preferred embodiments have been shown and described, various modifications and substitutions may be made thereto without departing from the spirit and scope of the invention. Accordingly, it is to be understood that the present invention has been described by way of illustrations and not limitation.

The invention claimed is:

1. A method of manufacturing an electrochemical cell comprising:
    forming a plurality of cell layers into a laminar sheet having two opposing major surfaces, each cell layer including a pair of electrodes and a separator electrically insulating the pair of electrodes;
    slicing the laminar sheet through both opposing major surfaces into a size less than the size of the laminar sheet; and
    slicing the laminar sheet parallel to the major surfaces thereby selecting the number of cell layers.

2. The method of manufacturing an electrochemical cell as in claim 1, further forming a gas transport layer adjacent to at least one electrode having one or more voids.

3. The method of manufacturing an electrochemical cell as in claim 2, wherein the gas transport layer includes at least one channel.

4. The method of manufacturing an electrochemical cell as in claim 2, wherein the gas transport layer includes a porous layer.

5. The method of manufacturing an electrochemical cell as in claim 2, wherein the voids are filled with a removable substance prior to slicing the laminar sheet at a temperature below the melting point of the removable substance, further wherein the removable substance is allowed to inch thereby forming plural electrochemical cells having at least one gas flow layer with a void for gas access to the at least one electrode.

6. The method of manufacturing an electrochemical cell as in claim 2, wherein at least one of the electrochemical cell comprises a metal air electrochemical cell, wherein one of the electrodes in each electrochemical cell comprises a metal, and the other electrode adjacent the gas transport layer in each electrochemical cell comprises an air diffusion electrode, further wherein a source of ion conducting electrolyte is provided.

7. The method of manufacturing an electrochemical cell as in claim 2, wherein at least one of the electrochemical cell comprises a metal air electrochemical cell, wherein one of the electrodes in each electrochemical cell comprises a metal, the other electrode in each electrochemical cell comprises an air diffusion electrode, and the separator provides a source of ion conducting electrolyte.

8. The method of manufacturing an electrochemical cell as in claim 1, wherein at least one of the electrochemical cells comprises an electrical storage capacitor.

9. The method of manufacturing an electrochemical cell as in claim 8, wherein the capacitor comprises a symmetrical capacitor.

10. The method of manufacturing an electrochemical cell as in claim 8, wherein the capacitor comprises an asymmetrical capacitor.

11. The method of manufacturing an electrochemical cell as in claim 10, wherein the electrodes comprise different amounts of high surface area active material, further wherein electrolyte is provided.

12. The method of manufacturing an electrochemical cell as in claim 10, wherein the electrodes comprise different amounts of Faradic psuedocapacitance materials, further wherein electrolyte is provided.

13. The method of manufacturing an electrochemical cell as in claim 10, wherein one electrode comprises high surface area active material and the other electrode comprises Faradic psuedocapacitance materials, further wherein electrolyte is provided.

14. The method of manufacturing an electrochemical cell as in claim 10, wherein the electrodes comprise different amounts of high surface area active material and hydrogel material, the hydrogel material comprising electrolyte therein.

15. The method of manufacturing an electrochemical cell as in claim 10, wherein the electrodes comprise different amounts of Faradic psuedocapacitance materials and hydrogel material.

16. The method of manufacturing an electrochemical cell as in claim 10, wherein one electrode comprises high surface area active material and hydrogel material and the other electrode comprises Faradic psuedocapacitance materials and hydrogel material.

17. The method of manufacturing an electrochemical cell as in claim 1, wherein at least one kerf is provided along a slice pattern, wherein the kerf is filled with a housing material to be used for at least a portion of a cell stack housing.

18. The method of manufacturing an electrochemical cell as in claim 17, wherein the kerf housing material is provided as each layer is formed.

19. The method of manufacturing an electrochemical cell as in claim 17, wherein each layer of kerf housing material is bonded to a preceding layer.

20. The method of manufacturing an electrochemical cell as in claim 17, wherein kerf housing material is provided as a set of layers is formed.

21. The method of manufacturing an electrochemical cell as in claim 17, wherein Iced housing material is provided alter layers have been formed.

22. The method of manufacturing an electrochemical cell as in claim 1, wherein at least one kerf is provided along a slice pattern, wherein the kerf is filled with a conductor material to be used for connecting at least a portion of cell components in the laminar structure.

23. The method of manufacturing an electrochemical cell as in claim 22, wherein conductor material is provided as each layer is formed.

24. The method of manufacturing an electrochemical cell as in claim 22, wherein each layer of conductor material is bonded to a preceding layer.

25. The method of manufacturing an electrochemical cell as in claim 22, wherein conductor material is provided as a set of layers is formed.

26. The method of manufacturing an electrochemical cell as in claim 22, wherein conductor material is provided after layers have been formed.

27. The method of manufacturing electrochemical cells as in claim 1, wherein at least one of the electrochemical cells comprises a flow-through capacitor.

28. The method of manufacturing an electrochemical cell as in claim 27, wherein the capacitor comprises a symmetrical capacitor.

29. The method of manufacturing an electrochemical cell as in claim 28, wherein the electrodes comprise high surface area active material.

30. The method of manufacturing an electrochemical cell as in claim 28, wherein the electrodes comprise high surface area active material and hydrogel material.

31. The method of manufacturing an electrochemical cell as in claim 27, wherein the capacitor comprises an asymmetrical capacitor.

32. The method of manufacturing an electrochemical cell as in claim 31, wherein the electrodes comprise high surface area active material of different quantifies.

33. The method of manufacturing an electrochemical cell as in claim 31, wherein the electrodes comprise high surface area active material of different quantities and hydrogel material.

34. The method of manufacturing electrochemical cells as in claim 1, wherein cells are manufactured to a pre-specified electrical capacity based on a size less than the size of the laminar sheet of one of the surfaces of the laminar sheet of each electrochemical cell.

35. The method of manufacturing electrochemical cells as in claim 1, further wherein Iced regions are provided at the locations on the laminar sheet corresponding to the position where slicing is to occur, further wherein the kerfs define a pattern of cutting of the laminar sheet.

36. The method of manufacturing an electrochemical cell as in claim 1, wherein at least one kerf is provided along a slice pattern, wherein the kerf is filled with a removable substance, a conductor path is formed in the removable substance, and conductor material is introduced in the conductor pat to be used for connecting at least a portion of cell components in the laminar sheet.

* * * * *